United States Patent [19]

Northrop

[11] Patent Number: 5,411,094
[45] Date of Patent: May 2, 1995

[54] IMBIBITION PROCESS USING A HORIZONTAL WELL FOR OIL PRODUCTION FROM LOW PERMEABILITY RESERVOIRS

[75] Inventor: Paul S. Northrop, Bakersfield, Calif.

[73] Assignee: Mobil Oil Corporation, Fairfax, Va.

[21] Appl. No.: 155,322

[22] Filed: Nov. 22, 1993

[51] Int. Cl.6 .................... E21B 43/22; E21B 43/24
[52] U.S. Cl. ........................ 166/303; 166/50; 166/305.1; 166/308
[58] Field of Search ............. 166/50, 303, 305.1, 166/306, 308

[56] References Cited

U.S. PATENT DOCUMENTS

| | | | |
|---|---|---|---|
| 4,116,275 | 9/1978 | Butler et al. | 166/303 |
| 4,167,470 | 9/1979 | Karnofsky. | |
| 4,374,023 | 2/1983 | Davis. | |
| 4,485,871 | 12/1984 | Davis | 166/266 |
| 4,828,031 | 5/1989 | Davis | 166/272 |
| 4,938,286 | 7/1990 | Jennings, Jr. | 166/280 |
| 5,085,276 | 2/1992 | Rivas et al. | 166/50 X |
| 5,141,054 | 8/1992 | Alameddine et al. | 166/50 X |
| 5,148,869 | 9/1992 | Sanchez | 166/303 |
| 5,167,280 | 12/1992 | Sanchez et al. | 166/50 X |

FOREIGN PATENT DOCUMENTS 1559948 1/1980 United Kingdom.

Primary Examiner—George A. Suchfield
Attorney, Agent, or Firm—Alexander J. McKillop; George W. Hager, Jr.; Charles A. Malone

[57] ABSTRACT

A method for enhanced oil recovery from a low permeability diatomaceous reservoir by imbibition is described. In this method, oil is displaced from the reservoir with a horizontal wellbore by a combination of applied fluid pressure, plus "enhanced imbibition." Enhanced imbibition is accomplished by adding chemical additives, water, or brine to an injection fluid so that rock in the tight diatomaceous reservoir has a stronger affinity for the water present therein, thus releasing oil from the rock. The method is either continuous or cyclic.

26 Claims, 2 Drawing Sheets

IMBITION PROCESS USING A HORIZONTAL WELL FOR OIL PRODUCTION FROM LOW PERMEABILITY RESERVOIRS

FIELD OF THE INVENTION

This invention relates to a process for the recovery of moderately to highly viscous hydrocarbons from subterranean diatomaceous oil reservoirs. Specifically, the invention relates to cyclic or continuous water and chemical additive injection while cyclicly or continuously producing oil and water from a single horizontal wellbore.

BACKGROUND OF THE INVENTION

Hydrocarbon bearing diatomaceous formations are unique because they often have high oil saturation and high porosity, but have little permeability, i.e., they contain significant amounts of oil but very small flow channels or limited fractures through which oil could flow and, ultimately, be recovered. The unique properties of this type of formation arise because of its morphology. The formation is composed largely of skeletal remains of diatoms. These skeletons and their fragments are hollow and fluids may flow only through natural micropores and through fractures and openings resulting from skeletal decrepitation and/or dissolution.

Oil recovery from diatomaceous formations is usually quite limited because a significant portion of oil saturation may be bypassed using conventional production techniques such as primary, waterflooding, cyclic or drive steaming. Significant improvement of oil recovery would require that a method of displacing oil from the interior of the diatoms into the flow channels between the diatoms be provided. Furthermore, it would be necessary to improve permeability in the natural flow channels so that the oil can be recovered.

Various methods have been proposed for increasing crude oil production from diatomaceous formations. For Example, U.S. Pat. No. 4,485,871 teaches a method of recovering hydrocarbons from diatomite in which an alcohol is injected into the formation followed by an aqueous alkaline solution. However, it has been found that certain formations do not respond to this type of stimulation. In particular, oil recovery using this method is not optimum in formations which are deeply buried and have not been extensively exposed to the atmosphere or oxygen bearing formation water. The interfacial tension and oil/rock wettability in these deeply buried formations must be modified in order to enhance oil recovery. A related method is described in U.S. Pat. No. 4,374,023.

U.S. Pat. No. 4,167,470 teaches an alternative method of recovering oil from diatomite in which a hydrocarbon solvent is contacted with mined diatomaceous ore in a 6 stage extraction process. Solvent is then recovered in a steam stripping apparatus. There are several problems in utilizing this process in a cost effective manner. For example, the ore must be mined, with the attendant environmental and economic considerations. Furthermore, the process is extremely complex and capital intensive. The process is an extraction process and discloses no provision for adding, for example, a chelating agent, and it is not a two-phase process such as is disclosed herein.

British Pat. No. 1,559,948 (Buckley) teaches a method of recovering heavy oil from tar sand (which is sometimes incorrectly attributed to being equivalent to diatomite), in which a steam distillable solvent and an oil soluble surfactant are simultaneously injected. The solvent is variously described as being, for example, kerosene or naphtha. The surfactants are described as being in one of two classes, i.e., thermally labile or steam distillable. An oil soluble surfactant such as thermally labile surfactants are suggested as being alkylaryl sulphonates or alkaryl naphthenic sulphonates. Examples of such steam distillable surfactants are suggested as being alkyl and other amines. Again, this is an extraction process and does not suggest a more preferred two-phase process.

Davis in U.S. Pat. No. 4,828,031 that issued on May 9, 1989 discloses a method for recovering oil from a diatomaceous formation. A solvent is injected into the diatomaceous formation followed by an aqueous surface active solution. The aqueous surface active solution contains a diatomite/oil water wettability improving agent and an oil/water surface tension lowering agent. The method may be supplemented by injection of water and/or steam into the diatomite. Injection pressure into the formation was held to just below the value where a long fracture may be induced.

Therefore, what is needed is a method that enhances an imbibition process to increase the rate of water uptake by a diatomaceous reservoir or formation where a horizontal well is utilized along with hydraulic fracturing.

SUMMARY OF THE INVENTION

In accordance with the above stated need, an improved oil recovery process for cyclic or continuous water and chemical additive injection along with concomitant oil production using a single horizontal wellbore is described. A water and chemical additive mixture passes out of slots or perforations along the horizontal wellbore containing two conduits or compartments. This mixture percolates outwardly through the diatomaceous formation. The mixture imbibes onto the diatomaceous matrix surrounding the horizontal wellbore causing the wettability of the matrix to be modified thereby causing oil to flow inwardly toward the wellbore, both countercurrently and tangentially to the percolating mixture.

Oil collects around and in the horizontal well as the mixture continuously percolates and imbibes into the matrix. In the continuous method, the mixture circulates down the wellbore's inner conduit or compartment while oil and water flow back through its outer compartment. As the mixture percolates into the matrix from the outer compartment of the horizontal wellbore, flowing water and oil from the diatomaceous matrix collects in a pool around the wellbore and is pulled countercurrently into the outer conduit or compartment along the length of the wellbore where it is produced to the surface.

This combination of additive mixture, percolation, and oil/water production occurs due to the usage of a dual conduit or compartment single production/injection tubing string. Pressure of this outer compartment is controlled such that the water and chemical mixture flow, under the influence of gravity and imbibition, into the hydrocarbonaceous fluid containing reservoir through slots or perforations along the outer compartment or conduit. Any chemical additive mixture, water, brine, or steam not taken by the formation is circulated back through the slotted outer conduit or compartment and produced to the surface.

In the cyclic method, the chemical additive mixture is injected into the diatomaceous matrix by a slotted or perforated horizontal wellbore where it leaks off and imbibes into the diatomaceous matrix. As the aqueous chemical additive mixture leaks off and imbibes into the matrix, oil from the matrix is displaced into the wellbore. Injection is ceased and the matrix is allowed to soak for about one day as imbibition and oil out flow continue. During this soaking period, water moves from the wellbore into the formation, while oil moves out of the diatomaceous matrix into the wellbore. Oil is then produced from the formation or reservoir.

The chemical additive mixture or steam enters the formation: (1) at a rate dictated by the rate of oil flow into the oil wellbore; (2) the rate at which oil and water are withdrawn; and (3) the pressure of the outer conduit or compartment when the continuous injection method is employed. A control scheme is utilized which limits the production of steam in the produced fluids such that the process is thermally efficient. Also, the produced fluids do not contain large quantities of water. Control is accomplished by raising the outer compartment's pressure when a high water to oil ratio is sensed at the surface.

It is therefore a primary object of this invention to provide an economically viable method for recovering initially immobile hydrocarbonaceous materials in diatomaceous reservoirs or formations where usage of vertical wells is not practical.

It is another object of this invention to extract viscous hydrocarbonaceous materials from a diatomaceous formation or reservoir with an aqueous chemical additive process using a single horizontal well.

It is yet another object of this invention to remove viscous hydrocarbonaceous materials from a subterranean diatomaceous oil reservoir by imbibing chemical additives into the diatomaceous matrix and flowing oil into a single horizontal wellbore.

It is still another object of this invention to utilize the countercurrent nature of flow within the reservoir to extract oil from a diatomaceous matrix while imbibing water into the matrix thereby providing for an insitu separation process.

It is still yet another object of this invention to provide for a continuous chemical additive mixture and oil production process from a single horizontal wellbore.

It is a further object of this invention to provide for an oil production process which utilizes hydraulic fracturing in a horizontal wellbore along with chemical additive mixture percolation to substantially increase oil production during oil inflow from a diatomaceous formation or reservoir.

DESCRIPTION OF THE PREFERRED EMBODIMENTS

Figure 1:
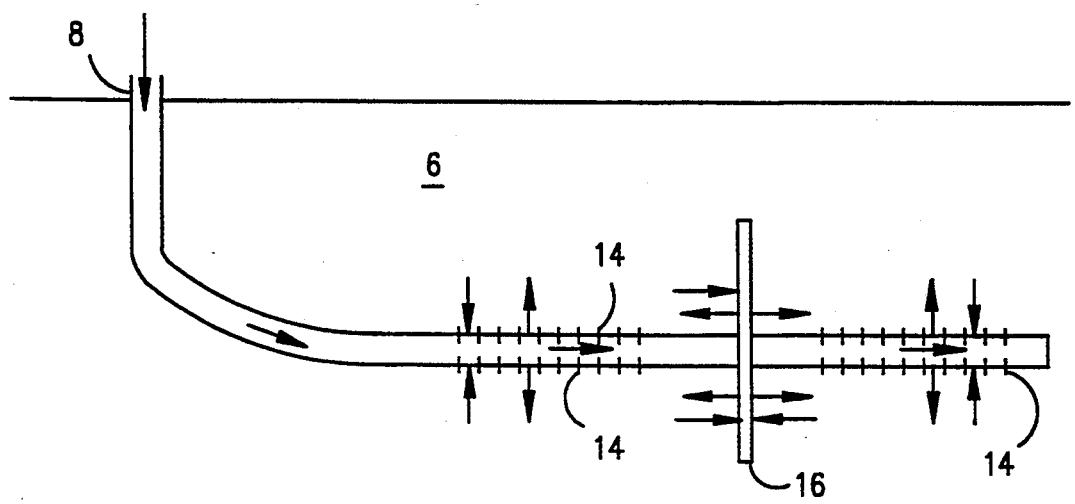
FIG. 1 is an enlarged cross-sectional view of a horizontal wellbore oriented perpendicular to the direction of flow within the wellbore which intersects a fracture during an injection stage of a cyclic imbibition process.

This invention is directed to a method for removing immobile hydrocarbonaceous fluids from a diatomaceous formation or reservoir 6 which formation is penetrated by a horizontal wellbore 8. A schematic drawing of a cyclic imbibition process where a horizontal wellbore is used during an injection cycle is depicted in FIG. 1. The horizontal wellbore may also contain an inner conduit or compartment 10 and an outer compartment or conduit 12. Placed within the outer conduit 12 along its horizontal length are perforations 14. The relationship between the inner conduit 10 and outer conduit 12 is shown in a cross-sectional view of FIG. 3 which is a schematic representation of a continuous imbibition process where a horizontal wellbore is utilized.

In a cyclic imbibition process embodiment of the invention, referring to FIG. 1, an aqueous chemical additive mixture, water, or brine is injected into horizontal wellbore 8. If the reservoir contains oil with a low viscosity, water or brine is injected into the formation. When the formation contains oil with a high viscosity, hot water, hot brine, or steam is injected into wellbore 8 to lower the viscosity of the oil. In either situation, the aqueous chemical additive mixture, water or brine leaks off into the formation while oil is displaced into the wellbore. Injection is ceased and the aqueous mixture, water, or brine is a allowed to soak for less than about twenty four hours so imbibition can continue. During this period, water moves from the wellbore into formation 6, while oil moves out of the rock matrix into the wellbore. Afterwards, the well is produced to remove the oil to the surface.

When a fracture 16, is present in the formation, either induced or natural, increased pressure during the injection stage will cause the fracture to open. Improved performance is obtained by the presence of natural or induced fractures. These fractures provide a larger area of contact with reservoir or formation 6. They also allow for additional volume of oil to accumulate. Decreasing the pressure resultant from cessation of injection or from production causes fracture 16 to close.

Figure 2:
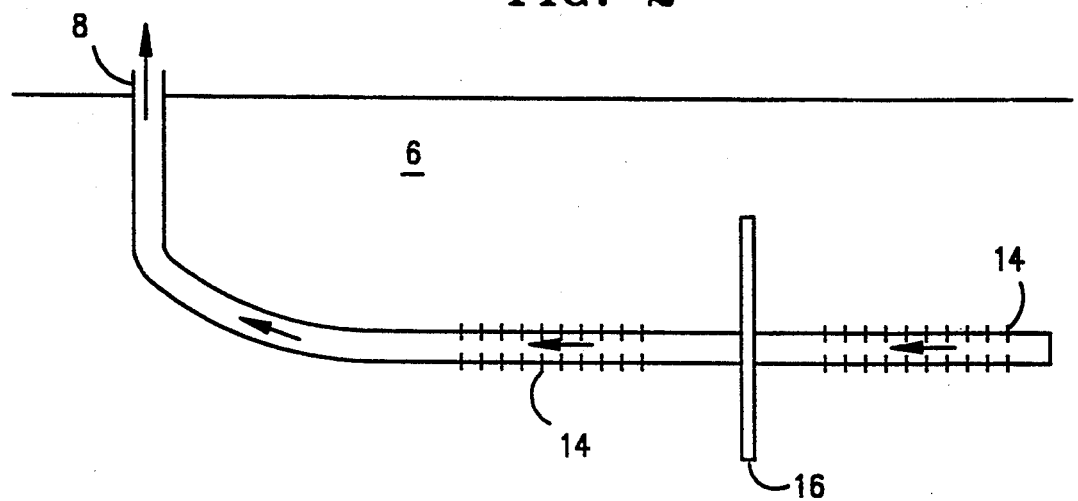
FIG. 2 is an enlarged cross-sectional view of a horizontal wellbore oriented perpendicular to the direction of flow within the wellbore which intersects a fracture during a production stage of a cyclic imbibition process.

The production stage of the cyclic imbibition method or process is depicted in FIG. 2. A method for creating fractures in a horizontal wellbore that can be utilized in the practice of this invention is disclosed in U.S. Pat. No. 4,938,286 which issued to Jennings, Jr. on Jul. 3, 1990. This patent is hereby incorporated herein by reference.

Once the production stage or cycle is ceased, the cycles of injection, soak, and production are repeated until a desired volume of oil or hydrocarbonaceous fluids have been produced from the reservoir. Repeating of the cycles is necessary because the volume of wellbore 8 is not large and the amount of oil recoverable per cycle is not that large. When using a continuous imbibition process in a horizontal wellbore, an aqueous chemical additive mixture, water, brine, or steam is allowed to continually circulate in and out of the horizontal wellbore 8 for a time sufficient to imbibe into the reservoir or formation 6. As mentioned above, hot water or brine is utilized when viscous oil is present in a reservoir. Another fluid that can be used is steam. The aqueous chemical mixture, water, brine, or steam is injected rate that allows aqueous imbibition to occur within formation 6 while oil moves into outer conduit or compartment 12. Oil moves into wellbore 12 from the reservoir via perforations 14 along the outer conduit or compartment 12 of said wellbore. These hydrocarbonaceous fluids or oil of reduced viscosity are continually removed from the reservoir via perforations 14 in outer conduit or compartment 12. A wellbore configuration which can be used in the practice of this invention is disclosed in U.S. Pat. No. 4,116,275 which issued to Butler et al. on September 1978. This patent is hereby incorporated by reference herein.

Aqueous chemical mixture, water, brine, or steam circulation into outer compartment or conduit 12 is controlled by a control valve (not shown). Pressure within the outer compartment or conduit 12 is controlled so that the chemical additive mixture, water, brine, or steam flow under the influence of gravity and imbibition, into the reservoir through wellbore perforations 14. Steam, aqueous chemical mixture, water, or brine that are not taken into the formation are circulated back through outer conduit or compartment 12 where they exit the horizontal wellbore to the surface. While the warmed or unwarmed hydrocarbonaceous fluids of reduced viscosity drain countercurrently pass the fluids that are being injected and imbibed into the diatomaceous formation, a hydrocarbonaceous fluid pool forms around and in the horizontal wellbore.

Figure 3:
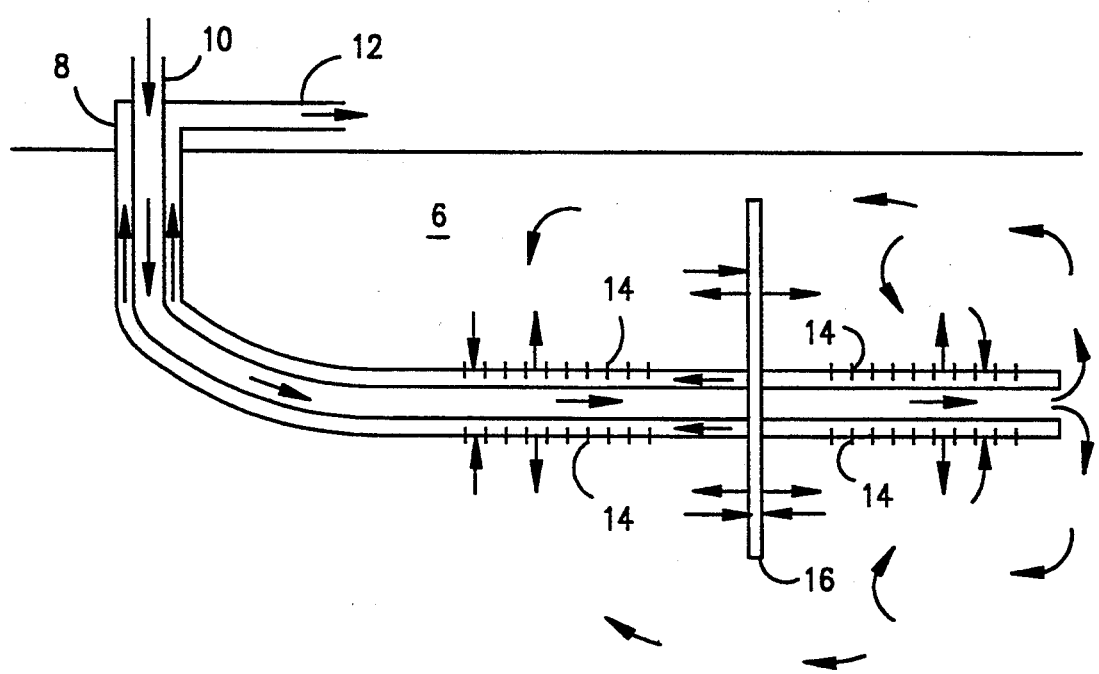
FIG. 3 depicts an enlarged cross-sectional view of a double concentric or compartmentalized horizontal wellbore oriented perpendicular to the direction of flow within the wellbore which intersects a fracture during a continuous chemical additive mixture imbibition process.

As is shown in FIG. 3, any aqueous chemical additive mixture, water, brine, or steam which have not been taken up by the diatomaceous matrix in the reservoir tend to flow outwardly and countercurrently into the pool which surrounds the wellbore whereupon they enter perforations 14 in outer compartment or conduit 12. Steam, hot water, or hot brine circulation within the wellbore provides heat to the pool surrounding said wellbore which facilitates the oil's movement into outer compartment or conduit 12 where it is produced to the surface.

Steam, aqueous chemical mixture, water, or brine are taken by the formation or reservoir at a rate which is dictated by the rate of oil drainage into the pool. The rate at which hydrocarbonaceous fluids and condensed steam are withdrawn is controlled by the pressure in outer compartment or conduit 12. The process is controlled so as to limit the production of chemical additive mixture, water, brine, or steam in fluids produced to the surface so that the process is forcibly placed in a imbibition dominated area. In this manner produced fluids do not contain large quantities of chemical additive mixture, water, brine, or steam. This control is maintained by raising the pressure within the inner conduit or compartment 10 when excessive injected fluids are sensed at the surface. Steam can alternatively break through at outer compartment or conduit 12. By operating the injection of fluids effectively, the process can be controlled so that gravity and imbibition influence the flow of viscous fluids so as to maintain a pool of oil or hydrocarbonaceous fluids around and in the horizontal wellbore.

Although the horizontal length of the wellbore can be modified as desired, as is preferred, the wellbore has a length of about 3,000 feet.

Since the process is operated in a gravity and imbibition dominated mode by controlling injected fluid production, oil surrounds the wellbore instead of the injected fluids. A gravity head operates on the oil pool to provide a "water lift" driving force for flow into perforations 14 within outer compartment or conduit 12.

A combination of chemical additives is used to increase water wetness of a rock thereby increasing the capillary pressure which forces oil and water from the diatomaceous formation. These chemical additives include wetting agents (e.g. mono-, di-, tri- basic forms of sodium or potassium phosphate, and sodium silicate). Experiments have shown that these agents can be used in concentrations of about 0.5 to about 2 wt % to increase oil expulsion by imbibition up to 70% over that which would be obtainable by the use of brine alone. It is believed that these chemicals are effective because they increase the water wetness of the rock which increases the capillary pressure thereby forcing the oil from the rock or diatomaceous matrix of the formation.

Another chemical additive which is used and mixed in with water or brine comprises surfactants. These surfactants can be either, sulfonates, ammonium salts of linear alcohol, ethoxy sulfates, or calcium phenol ethoxylated alkyl sulfonates. These surfactants lower the interfacial tension between oil and water thereby allowing oil to flow more freely through the diatomaceous matrix. Imbibition experiments with up to 3 wt % of active surfactant concentration indicate a 31% improvement in oil recovery over that obtainable with brine alone. The primary effect of the surfactant is believed to take place at the matrix/fracture interface, where it frees oil from the rock face. This effect is very significant in a field where fracture surfaces may be several thousand square feet. These wettability agents and surfactants are discussed in U.S. Pat. No. 4,828,031 which issued to Davis on May 9, 1989. This patent is hereby incorporated by reference herein.

An alternative to using a surfactant is the use of sodium hydroxide which is placed into the water or brine. The sodium hydroxide or potassium hydroxide which is used forms a caustic that reacts with organic acids in oil to produce natural surfactants. These surfactants will act in a manner similar to purchased surfactants. Experiments indicate that a pH of around 12 will significantly increase oil recovery by imbibition. Caustic or alkaline flooding has been used in ordinary sandstone reservoirs with good results. Although silica dissolution is a concern at increased pH's, tests of produced field waters from thermal operations have shown that silica dissolution is relatively minor.

As will be understood by those skilled in the art, hot water or hot brine when used will enhance the imbibition process by further increasing matrix wettability. Increased matrix wettability increases the capillary pressure. Increased temperature also results in a decrease in the oil's viscosity and an increase in oil mobility. Some oil or hydrocarbonaceous fluids will be displaced by counter current imbibition into fractures communicating with the horizontal well.

Use of the chemical additives in combination with a fractured diatomaceous reservoir or formation will allow substantially more hydrocarbonaceous fluids or oil to be produced from the formation than heretofore possible. This occurs because the fractures fluidly communicating with the horizontal well allow substantially more contact by the mixture containing the chemical additives which removes more oil from the formation. During the injection of the chemical additives as well as the other fluids, the injection pressure can be kept below the pressure required to fracture the formation. Alternatively, high pressures can be used to induce fractures, thereby increasing area of contact with the reservoir.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed:

1. A method for removing initially immobile hydrocarbons from a diatomaceous formation or reservoir penetrated by a horizontal wellbore comprising:
   a) circulating an aqueous mixture containing a chemical additive into said horizontal wellbore at a rate and for a time sufficient to cause oil to flow from said diatomaceous formation which additive is present in an amount effective to enhance imbibition by increasing a rate of water uptake from said formation so as to increase oil flow therefrom; and
   b) removing oil or hydrocarbonaceous fluids from the formation to the surface.

2. The method as recited in claim 1 where the circulation of said aqueous mixture and production of oil or hydrocarbonaceous fluids is cyclic.

3. The method as recited in claim 1 where the circulation of said aqueous mixture and production of oil or hydrocarbonaceous fluids is continuous.

4. The method as recited in claim 1 where the chemical additive comprises a surfactant or a wetting agent.

5. The method as recited in claim 1 where in step a) the chemical additive comprises an alkali metal hydroxide which produces a surfactant in the formation by the reaction of said hydroxide with organic acids in the oil.

6. The method as recited in claim 1 where the formation is fractured.

7. The method as recited in claim 1 where the aqueous mixture utilized comprises water or brine.

8. The method as recited in claim 1 where the aqueous mixture comprises hot water or hot brine.

9. The method as recited in claim 1 where the aqueous mixture comprises hot water or brine and a surfactant.

10. The method as recited in claim 1 where the aqueous mixture comprises hot water or brine and sodium hydroxide.

11. The method as recited in claim 1 where the aqueous mixture comprises hot water or brine, a surfactant, and a wettability agent.

12. The method as recited in claim 1 where the horizontal well is up to about 3,000 feet in length.

13. A method for removing initially immobile hydrocarbons from a diatomaceous formation or reservoir penetrated by a horizontal wellbore comprising:
   a) circulating an aqueous mixture containing a chemical additive into said horizontal wellbore at a rate and for a time sufficient to cause oil to flow from said diatomaceous formation which additive is present in an amount effective to enhance imbibition by increasing a rate of water uptake from said formation so as to increase oil flow therefrom where said additive is selected from a member of the group consisting of a surfactant, a wetting agent, or an alkali metal hydroxide; and
   b) removing oil or hydrocarbonaceous fluids from the formation to the surface.

14. The method as recited in claim 13 where the alkali metal hydroxide is sodium or potassium hydroxide.

15. The method as recited in claim 1 where in step a) the alkali metal hydroxide comprises sodium or potassium hydroxide, or mixtures thereof, which upon entry into said formation produces a surfactant via a reaction with organic acids in the oil.

16. The method as recited in claim 13 where the aqueous mixture comprises water, hot water, or brine.

17. The method as recited in claim 13 where the circulation of said aqueous mixture and production of oil or hydrocarbonaceous fluids is cyclic.

18. The method as recited in claim 13 where the circulation of said aqueous mixture and production of oil or hydrocarbonaceous fluids is continuous.

19. The method as recited in claim 13 where the formation is fractured.

20. The method as recited in claim 13 where the horizontal well is up to about 3,000 feet in length.

21. A method for removing initially immobile hydrocarbons from a diatomaceous formation or reservoir penetrated by a horizontal wellbore comprising:
   a) circulating an aqueous mixture containing a surfactant into said horizontal wellbore at a rate and for a time sufficient to cause oil to flow from said diatomaceous formation which additive is present in an amount effective to enhance imbibition by increasing a rate of water uptake from said formation so as to increase oil flow therefrom; and
   b) removing oil or hydrocarbonaceous fluids from the formation to the surface.

22. The method as recited in claim 21 where the aqueous mixture comprises water, hot water, or brine.

23. The method as recited in claim 21 where the circulation of said aqueous mixture and production of oil or hydrocarbonaceous fluids is cyclic.

24. The method as recited in claim 21 where the circulation of said aqueous mixture and production of oil or hydrocarbonaceous fluids is continuous.

25. The method as recited in claim 21 where the formation is fractured.

26. The method as recited in claim 21 where the horizontal well is up to about 3,000 feet in length.

* * * * *